(12) United States Patent
Pierce

(10) Patent No.: X8542
(45) Date of Patent: Dec. 17, 1834

(54) HAMMER,STONE

(76) Inventor: Galen H, Pierce

Galen H. Pierce, of Middleborough, Mss.
Letters Patent

The schedule referred to in these Letters Patent, and making part of the same, containing a description in the words of the said Galen H. Pierce himself, of his improvement in the manufacture of hammers for cutting Stones.

---

To all to whom these presents shall come; Be it known that I, Galen H. Pierce, of Middleborough, in the County of Plymouth, and State of Massachusetts, have invent a new and useful improvement in the manufacture of Hammers for cutting stones, and that the following is a full and exact description of said improvement.

The end of the eye or head piece of the hammer is grooved, morticed, or dovetailed in the direction of the heft or handle. To this groove, mortice, or dovetailing the die or blade is exactly fitted and being inserted in the groove, mortice, or dovetailing, it is there fastened firmly by screws (three being deemed sufficient) screwed into the side of the eye or head piece, the outside ones of which screw into the die or blade into a female screw cut there to receive them, but the middle or inside one of which having a flat end, screws directly up hard against the die or blade. Or the die or blade being inserted into the eye or head piece, in the same manner as before described, may be fastened in, by a round, tapering pin, fitted accurately into a hole cut longitudinally, the small end of which is in a direction from the handle, and half of which said hole, into which said pin is fitted, shall be cut or bored on one side of the die or blade, and the other half in the side of the eye or head piece next to it.

What I claim as my said invention or improvement, and for which I herein claim letters patent, is the mode above described, of fastening the dies or blades into the eye or head-piece of a hammer for cutting stones.

Witnesses
John Washburn
B. T. Presbury

Galen H. Pierce

392 [illegible]

Exd
[illegible]